United States Patent
Makovsky et al.

(10) Patent No.: US 10,691,850 B1
(45) Date of Patent: Jun. 23, 2020

(54) POWER PROJECTION USING MACHINE LEARNING

(71) Applicant: Amazon Technologies, Inc., Seattle, WA (US)

(72) Inventors: Lev Makovsky, Seattle, WA (US); Adi Habusha, Moshav Alonei Abba (IL); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/219,205

(22) Filed: Dec. 13, 2018

(51) Int. Cl.
*G06F 30/327* (2020.01)
*G06F 7/02* (2006.01)
*G06N 20/00* (2019.01)
*G06F 119/06* (2020.01)

(52) U.S. Cl.
CPC ............ *G06F 30/327* (2020.01); *G06F 7/026* (2013.01); *G06N 20/00* (2019.01); *G06F 2119/06* (2020.01)

(58) Field of Classification Search
CPC .. G06F 17/504; G06F 17/505; G06F 17/5022; G06F 17/5027; G06F 17/5036; G06F 2217/78; G06F 30/327; G06F 7/026; G06F 2219/06
USPC ........... 703/18; 716/104, 106, 109, 133, 136
See application file for complete search history.

(56) References Cited

U.S. PATENT DOCUMENTS

| | | | |
|---|---|---|---|
| 2003/0097348 A1* | 5/2003 | Cao ...................... | G06F 17/5022 706/12 |
| 2004/0088151 A1* | 5/2004 | Burton ................ | G06F 17/5022 703/18 |
| 2007/0276645 A1* | 11/2007 | Veller ................. | G06F 17/5022 703/18 |

OTHER PUBLICATIONS

Wu et al., "GPGPU Performance and Power Estimation Using Machine Learning", 2015 IEEE 21st International Symposium on High Performance Computer Architecture (HPCA), Feb. 2015, 13 pages.

* cited by examiner

*Primary Examiner* — Paul Dinh
(74) *Attorney, Agent, or Firm* — Kilpatrick Townsend & Stockton LLP (57) ABSTRACT

A power analysis system for an integrated circuit device design can use machine learning to determine an estimated power consumption of the design. In various examples, the system can generate workloads for a power projection tool, which can include less than all the data of a full suite of power projection tests. The results from the power projection tool can be used to train a machine learning data model. From the results, the data model can learn the functions of the design by grouping together cells that are triggered together by the same signals. The data model can also learn estimated power consumption for each of the functions. The output of the data model can then be used to configure a design testing tool, which can run tests on the design. The output of the tests can then be used to compute an estimated overall power consumption for the design.

21 Claims, 6 Drawing Sheets

Generating a set of workloads from a set of power analysis tests, the set of workloads including a subset of data of the set of power analysis tests, the subset of data being less than all data of the set of power analysis tests
602

↓

Causing execution of a power projection tool on the integrated circuit device design, wherein the power projection tool takes as input the set of workloads and drives the subset of data into the integrated circuit device design
604

↓

Obtaining results from the execution of the power projection tool, the results including a listing of signals of the integrated circuit device design and estimated power consumption associated with signals in the listing of signals
606

↓

Inputting the results into a data model, wherein the data model learns from the results the listing of signals and the estimated power consumption, and wherein the data model outputs a set of functions performed by the integrated circuit device design, a set of signals that trigger the set of functions, and particular estimated power consumption associated with each of the set of functions
608

↓

Generating, using the output of the data model, a configuration for a design testing tool, wherein the configuration includes the set of signals that trigger the set of functions, the set of signals being less than all signals in the listing of signals, and wherein the configuration instructs the design testing tool to monitor toggling of the set of signals
610

↓

Causing execution of a design testing tool, wherein the design testing tool takes as input the configuration, and wherein the design testing tool performs tests on the integrated circuit device design and outputs results, the results including a record of activity of the set of signals during performance of the tests
612

FIG. 6

POWER PROJECTION USING MACHINE LEARNING

BACKGROUND

In some applications, power analysis is a process by which the power consumption of an integrated circuit device is determined. Power analysis can be conducted during the design process of an integrated circuit device, so that the expected power consumption of the device can be estimated, and changes to the design can be made if the estimated power consumption is too great. The power consumption of the device can be estimated using, for example, theoretical charge and discharge values for the logic cells that will make up the device once the device is constructed, and toggle rates of signals that drive the logic cells. The theoretical power values may be based on physical characteristics of the logic cells and/or empirical testing, and may be available in libraries produced by a semiconductor fabricator.

In various examples, power analysis can be conducted by exercising the integrated circuit device design. For example, a simulation-based power analysis tool can execute a software simulation that includes code that represents the integrated circuit device. In this example, the tool can drive inputs into the simulated device, and can process the outputs of the device. As another example, an emulation-based power analysis tool can use the code that represents the integrated circuit device to configure a hardware system (often referred to as an emulator) to reproduce the design. In this example, the emulation system can drive inputs into the emulated device, and process the outputs. In each of these examples, the tool can further capture the toggle rates of signals in the device, and record the cells that are affected by toggling of the signals. A total power consumption, as well as steady-state power consumption and/or peak and trough power consumption can be calculated.

BRIEF DESCRIPTION OF THE DRAWINGS

Various examples in accordance with the present disclosure will be described with reference to the drawings, in which:

FIG. 6 includes a flowchart illustrating an example of a process 600 for power analysis of an integrated circuit device design;

DETAILED DESCRIPTION

High-performance integrated circuit devices can consume a large amount of power. Reducing the power consumption of a device may be necessary for various reasons. For example, high power consumption in an integrated circuit device can lead to early failure of the device, due to overheating and other issues. Extensive cooling can be added to a system in which the device operates, to avoid overheating of the device or of other components in the system, but the cooling system may increase the cost of the system beyond a commercially reasonable amount and/or increase the physical size of the system. As another example, a system in which the integrated circuit device is to operate must be able to supply adequate power, which may limit the systems in which the device can be used.

Energy efficient design can reduce power that an integrated circuit device will consume once the device is manufactured. Energy efficient design can include making changes to the functions performed by the device and/or the manner in which the device performs the functions, with these changes being made during the design of the device. To understand the changes that may need to be made, the design development of the device can include determining estimates of the device's power consumption, at various stages of the development. Power analysis can begin as early as during the microarchitecture development and can continue until as late as the physical design stage. Accurate, effective, and flexible power estimation tools and workflows may thus be needed, which can produce power consumption projections at the various stages of the design life cycle.

Power analysis can have difficulties that can affect the accuracy of the results and/or the efficiency with which useful results can be produced. For example, power consumption can relate directly to the performance of the integrated circuit device. Thus, to obtain accurate power consumption estimations, it may be desirable to extract power estimation results while the device is under what is expected to be normal operation. For example, the device can be made to execute software that the device will run when in use. Simulating a pre-silicon device design, however, can be very time consuming, potentially requiring hours of simulation time to exercise each of the functions of the device. Tools, such as emulators, may be faster than a software simulation, but may provide less visibility into the inner workings of the device during the device's operation.

The amount of data that may be produced by either simulations or emulations can also be extremely large. Accurate results can be obtained by extracting, for each of the signals in the entire device, the number of times the signals toggled. For integrated circuit device designs of any size, the resulting data may be very large, particularly for any test that runs for more than a few milliseconds. This amount of data may require a large amount of disk space, and may take a very long time to process into useful information. Additionally, in some cases, some signals and cells within a device design may not be accessible, such as when the device includes Intellectual Property ("IP;" e.g., components that are provided by other parties and that may be instantiated in the design as "black boxes," meaning that the internal workings of the components are hidden).

An alternative to extracting toggle activity for every signal is to use abstract models to identify signals that may be the most significant contributors to the overall power consumption. An abstract model can describe, for example, functions performed by blocks in the device, at various levels of granularity. For example, the integrated circuit device may include an arithmetic logic unit (ALU), in which case the abstract model can include functions such as "ALU computation." As another example, the integrated circuit device can include a memory, in which case the abstract model can include functions such as "memory read" and "memory write." The abstract model can further describe groups of logic cells that charge and/or discharge when a function is activated. For purposes of power analysis, the signals within the group of cells need not be analyzed, on the assumption that, on average, all the signals activate together and in about the same way each time the function of the cells is performed. Thus, for a group of logic cells that perform the function, the only signal or signals that may be significant are those that activate the function. Power analysis can thus be conducted primarily on these significant signals (also referred to herein as triggering signals), which may greatly reduce the number of signals that need to be monitored. By performing analysis on less than all of the device, power analysis tests can be performed more quickly, and can produce less data that needs to be analyzed.

Characterizing a block to determine an abstract model, however, may require extensive knowledge of the block. This process has previously been performed by people, such as the design engineer that is developing the block. Additionally, as the block progresses in the design process, the power consumption of the blocks may change, necessitating updating of the abstract model.

While accurate power analysis can be achieved by using abstract models of a design, and may be achieved more quickly than by examining the entire design, the requirement of human effort may be an obstacle to using abstract models.

Reducing the effort to determine abstract models for an integrated circuit device, particularly by automating the process, can result in reducing the amount of data produced by a power projection test. The smaller amount of data can then be processed more quickly to understand the power consumption of the device. In various implementations, provided are techniques using machine learning for determining the functions of an integrated circuit device design, and the estimated power consumption associated with the functions. The techniques can include generating a reduced set of input for a power projection tool. The input for the power project tool are also referred to herein as workloads. The power projection tool need only exercise each function of the integrated circuit device design once, hence the input workloads can be far smaller than the workloads that would be needed to perform a complete power analysis of the design. Upon being executed, the power projection tool can output a listing of signals on the integrated circuit device design and power estimations for each signal.

The output of the power projection tool can then be used to train a machine learning data model. From the output, the machine learning model can learn the functions performed by the device, the signals that trigger the functions, and the estimated power consumption of each function. The output of the data model can then be used to generate a configuration for a design testing tool. The design testing tool can perform tests on the integrated circuit device design, and use the configuration to identify signals to monitor. For example, the design testing tool can monitor only the signals that trigger the functions. The number of times the functions were triggered and the estimated power consumption of each function (as determined by the data model) can then be used to compute the overall power consumption of the integrated circuit device.

Using the techniques discussed here, a machine learning data model can reduce the human effort needed to identify the functions of an integrated circuit device design. As noted above, identifying the functions and signals that trigger the functions can reduce the time required to produce power analysis data, and can reduce the size of the data, which can lead to faster computation of the overall power consumption of the integrated circuit device. Additionally, the time required to perform power analysis can be further reduced using a design testing tool, such as a simulator, in conjunction with the output of the data model. The design testing tool can be used to count the number of times triggering signals toggled, without also performing power estimation. Instead, the output of the design testing tool can be used with power estimations determined by the data model to computing an overall power consumption for the device.

In the following description, various examples will be described. For purposes of explanation, specific configurations and details are set forth in order to provide a thorough understanding of these examples. However, it will also be apparent to one skilled in the art that the examples may be practiced without the specific details. Furthermore, well-known features may be omitted or simplified in order not to obscure the examples being described.

Figure 1:
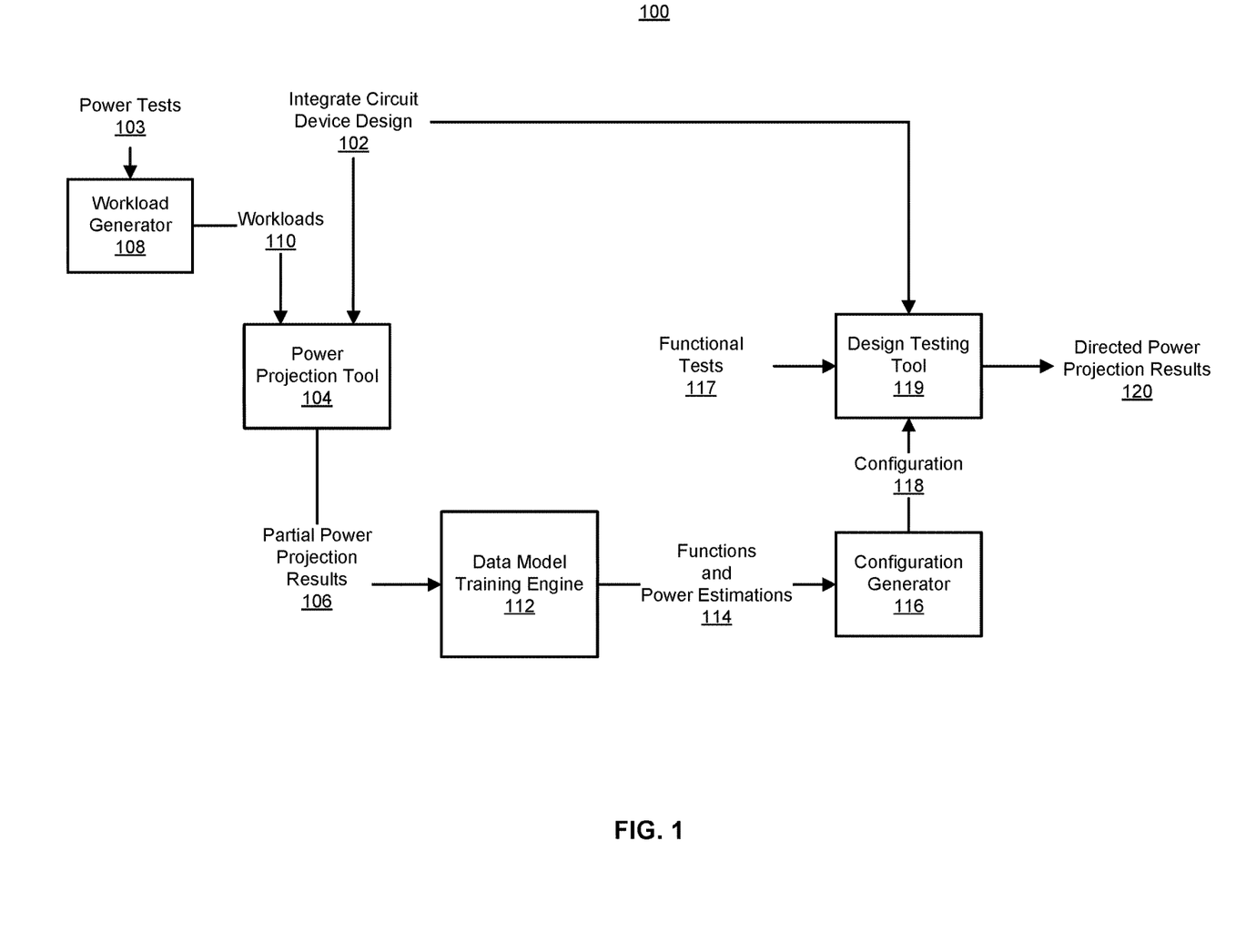
FIG. 1 includes a block diagram of an example system that includes using a data model to identify functions performed by an integrated circuit device design, and power estimations associated with the functions.

FIG. 1 includes a block diagram of an example system 100 that includes using a data model to identify functions performed by an integrated circuit device design 102, and power estimations associated with the functions. In various examples, the system 100 can include one or more computing devices that can implement components of the system 100 and/or perform steps illustrated as performed by the system 100. The computing devices can include one or more processors and non-transitory computer-readable medium that can store instructions. The instructions, when executed by a processor of a computing device, can cause the computing device to perform steps of the illustrated system 100.

In various examples, the system 100 can include a power projection tool 104. In various examples, the power projection tool 104 can be a standalone software program that can be independently executed within the system 100. For example, the power projection tool 104 maybe a software program that can be invoked from a command line or by activating an icon in a graphical user interface. In some examples, the power projection tool 104 is a commercial software program.

In various examples, the power projection tool 104 can perform power analysis on an integrated circuit device design 102. The integrated circuit device design 102 can be provided in the form of code or program code, such as Register Transfer Level (RTL) code or netlist code. As another example, the integrated circuit device design 102 can be provided as an architecture description. In these and other examples, the code for the integrated circuit device design 102 can describe the integrated circuit device design 102 in terms of logic blocks, logic cells that form the logic blocks, and/or signals that connect the logic blocks and/or cells. The integrated circuit device design 102 can further include input ports or pins and output ports and pins, through which the integrated circuit device design 102 communicates with other devices.

In various examples, the power projection tool 104 can take as input a configuration that includes parameters that define the scope of the analysis the tool is to conduct. For example, the configuration can include a listing of signals, logic blocks, and/or logic cells for which the power projection tool 104 is to extract power estimations, which may be fewer than all of the signals, logic blocks, and/or logic cells of the integrated circuit device design 102. Signals, logic blocks, and/or logic cells can be described in the configuration, for example, by an instance name. The configuration can be provided, for example, as an input file (which may be in plain text and/or formatted text), as command line arguments, and/or through a graphical user interface for the power projection tool 104.

To perform power projection, in various examples, the power projection tool 104 can exercise the functions of the integrated circuit device design 102 by running power tests 103. A power analysis test can include data, also referred to as stimulus, which the power projection tool 104 can drive into the integrated circuit device design 102, similar to the manner in which data will be driven into the integrated circuit device design 102 once the design has been built into a physical device. Running a test can include driving signals into the input ports and processing signals received at the output ports. The signals driven into the integrated circuit device design 102 can represent transactions and/or data the integrated circuit device design 102 might receive while being operated. For example, transactions and data can be driven into the integrated circuit device design 102 to reset, initialize, and configure the integrated circuit device design 102, and to then process data using the functionality provided by integrated circuit device design 102. Outputs from the integrated circuit device design 102 can be used to determine further inputs, and/or to determine whether the integrated circuit device design 102 is behaving correctly.

While a test is running, the power projection tool 104 can perform power analysis on the integrated circuit device design 102. For example, the power projection tool 104 can monitor signals in the integrated circuit device design 102 and count how many times each signal toggled (e.g., transitioned from 0 to 1 and/or from 1 to 0). As a further example, the power projection tool 104 can count how many times cells in the integrated circuit device design 102 charged (e.g., powered up from an unpowered state) and/or discharged (e.g., returned from a powered-up state to an unpowered state). The power projection tool 104 can subsequently estimate the power consumed by the integrated circuit device design 102 in executing the test by multiplying the number of times a signal toggled by a theoretical power consumption for each toggle, multiplying the number of times a cell charged and/or discharged, and summing the results.

In some examples, the power projection tool 104 can simulate the integrated circuit device design 102 in order to execute tests on the integrated circuit device design 102. A simulation is a software program that incorporates the code for the integrated circuit device design 102, and simulates the driving of signals into the integrated circuit device design 102. A simulation can provide very accurate power estimations because each signal and cell in the integrated circuit device design 102 may be accessible to the power projection tool 104. An exception may be when the integrated circuit device design 102 incorporates "IP" blocks; that is, components whose internal structure may not be visible. In these cases, power consumption by the IP blocks may be calculated from power estimations provided with the IP blocks.

Software simulations can be very slow, however. For example, the simulation may require minutes to simulate milliseconds of real-life operation of the integrated circuit device design 102. Thus, in some examples, the power projection tool 104 can be an emulator. An emulator is a hardware device that includes configurable components, such as an array of Field Programmable Array (FPGA) devices or Complex Programmable Logic Devices (CPLDs). The emulator can program the configurable components to implement the functions performed by the integrated circuit device design 102. Because of the use of hardware components, an emulator can execute tests on the integrated circuit device design 102 very quickly. An emulator, however, may not be able to accurately model an IP block, due to having no visibility into the inner operations of the IP block.

In various examples, the power projection tool 104 can be used to perform a full power analysis of the integrated circuit device design 102. For example, the power projection tool 104 can be made to run a suite of power tests 103 that attempt to thoroughly exercise the functions of the integrated circuit device design 102, and which may each run for some time. In this example, the power projection tool 104 can be configured to monitor substantially all signals of the integrated circuit device design 102 so that the overall power consumption of the integrated circuit device design 102, as well as the power consumption of specific blocks, can be determined.

The power projections that the power projection tool 104 can determine can be very accurate when the power projection tool 104 is configured to each signal and/or cell of the integrated circuit device design 102 over the execution of many tests. The amount of data that the power projection tool 104 might produce, however, can be quite large, such as on the order of hundreds of gigabytes for device of moderate size. Storing such a large amount of data can require a large amount of disk space. Additionally, processing such a large amount of data to determine the power consumption of the integrated circuit device design 102 can be very time consuming.

As discussed above, having the power projection tool 104 execute a whole suite of power tests 103 can require a lot of time, and the amount of data produced by having the power projection tool 104 monitor all signals in the integrated circuit device design 102 can be substantial. Thus, in various implementations, the system 100 includes a workload generator 108 that can produced a set of workloads 110 for the power projection tool 104. The workload generator 108 can be, for example, a software program that can be provided power tests 103 as input. The workload generator 108 can be a standalone software program or a component of a larger program, which may include components that perform other parts of the illustrated system 100.

In various examples, the workload generator 108 can take as input the power tests 103 that would otherwise be used to perform a complete power analysis, and from the power tests 103 produce a set of workloads 110. The workloads can include less than all of the data of the power tests 103. For example, the workload generator 108 can determine functions of the integrated circuit device design 102 that are exercised by the power tests 103, and based on this information, can select specific tests that, together, exercise each of the functions of the power tests 103 at least once. In this example, the workload generator 108 may be able to determine the functions exercised by each test from a description include with each test, from a structure of the test, by parsing the contents of a test, and/or from simulating the test. As another example, the workload generator 108 can take a test that takes a long time to run, and can divide the data for the test into smaller portions that each take less time to run. For example, a test that would take 10 milliseconds to run can be divided into 1000 workloads that each take 10 microseconds to run.

The workloads 110 thus can include fragments of the power tests 103 and short power tests, which may be sufficient to toggle each of the signals in the integrated circuit device design 102 at least a few times. The system 100, for example using an automated software program such as a script, can execute the power projection tool 104 with the workloads 110 as inputs. Because the workloads 110 include less than all of the data of the power tests 103, the workloads 110 can take much less time to run through the power projection tool 104. Additionally, though the power projection tool 104 may still be configured to analyze all signals of the integrated circuit device design 102, the output of the power projection tool 104 may be much smaller in size.

Because the output of running the workloads 110 through the power projection tool 104 is less than the output that would be produced by running power tests 103 through the power projection tool 104, the output is referred to herein as partial power projection results 106.

In various examples, the partial power projection results 106 can include a listing of signals in the integrated circuit device design 102 and an estimated power consumption for the signals. The listing of signals can include each signal that was monitored by the power projection tool 104, which, in the case of the partial power projection results 106, should include substantially all of the signals of the integrated circuit device design 102 (excepting signals in IP blocks that might not be visible). The estimated power consumption can be represented, for example, by a number of times a signal toggled and/or the number of times a cell was charged and/or discharged by toggling of the signal.

In various examples, the partial power projection results 106 can be input into a data model training engine 112 to train a machine learning data model. Using the partial power projection results 106, the data model training engine 112 can train the data model using various machine learning techniques. For example, the data model training engine 112 can implement clustering analysis, anomaly detection, neural networking, a variant of one of these learning techniques, another technique, or a combination of techniques. In some examples, the learning technique used by the data model training engine 112 is an unsupervised learning technique. By training the data model on the training workloads 110, the data model can learn the signals in the integrated circuit device design 102 and the estimated power consumption associated with the signals. From this information, the data model can derive functions of the integrated circuit device design 102, for example, by associating the toggling of signals with logic cells that are affected by the toggles. As an example, toggling of a read enable input signal for a memory can activate logic that causes a set of cells in the memory to be read. In this example, the data model can associate activation of the read enable input with the power consumption that occurs when the memory cells are read. Further to this example, given many occurrences of reading of the memory, the data model can determine an average power consumption that occurs when the memory is read.

In various examples, given a certain number of training workloads 110, the data model can output functions and power estimations 114, where the functions are functions that can be performed by the integrated circuit device design 102 and the power estimations are estimated power consumption associated with each functions. The functions can be abstract descriptions of what the integrated circuit device design 102 can do, such as "memory read" and "memory write" for a memory, or "instruction fetch" for an instruction execution unit. The data model may output labels such as "memory read," but is more likely to describe a "memory read" operation by listing a grouping of cells that charge or discharge in the process of a memory read operation, and one or more signals that trigger the operation, such as a read enable signal and/or a set of address signals. In some examples, the groupings of cells output by the data model can overlap, such as would be the case for a "memory read" and a "memory write" operation for the same memory. In this example, the functions can be distinguished by having different signals that trigger the operations (e.g., a write enable signal triggers the memory write operation where a read enable signal triggers the read operation).

In various examples, the groupings of cells produced by the data model and the associated triggering signals can be similar to what can be derived from abstract data models of the integrated circuit device design 102. For example, the engineer designing a logic block of the integrated circuit device design 102 will know that the logic block includes a memory, and thus can specify the portion of the code for the logic block that represents the memory. The engineer can further specify signals that trigger a memory read operation or a memory write operation. An automated process, possibly one included in the power projection tool 104, can translate the engineer's description of the operations of the logic block into the groups of cells that are activated by the triggering signals. The power projection tool 104 can then be configured to treat the group of cells as one logical block for purposes of power projection.

In various examples, the data model can mimic the modeling process, and do so in an automated manner. For example, by associating a signal with a one or more cells that are activated by the signal, the data model can determine that the cells perform a function that is triggered by the signal. In this example, by looking for cases where a signal or several signals always, on average, activate the same group of cells, the data model can determine that the cells perform a function that is triggered by the signal or signals.

The data model can further determine an estimated power consumption for the function. For example, the training workloads 110 can include a power consumption cost for the toggling of the signal, as well as power consumed when a cell charges and/or discharges. The data model can use this information, for example, by summing the power consumption cost of a triggering signal and the cells activated by the signal, to determine an estimated power consumption for the function that is performed when the cells are activated.

The system 100 can input the functions and power estimations 114 into a configuration generator 116, which can output a configuration 118 for a design testing tool 119. In various examples, the design testing tool 119 can be a software program for testing the operation of the integrated circuit device design 102. For example, the design testing tool 119 can be a hardware simulator that can simulate the circuitry described by the integrated circuit device design 102. As another example, the design testing tool 119 can be a hardware emulator with physical circuit components that can be configured to perform the operations of the integrated circuit device design 102. The design testing tool 119 can be a commercial software program or a commercial hardware component. In some examples, the power projection tool 104 can be used for the design testing tool 119, as discussed further below.

In various examples, the configuration 118 can be used when the design testing tool 119 executes tests, which may be referred to herein as functional tests 117. The functional tests 117 can be the same tests as the power tests 103, and/or can include tests more specifically designed to exercise the functionality of the integrated circuit device design 102 rather than to perform power analysis. Executing a test can include driving data into the input pins of the integrated circuit device design 102 and processing data received at the output pins. Execution of a test can include operations such as verifying that the integrated circuit device design 102 is performing correctly (e.g., using monitors and/or checkers that can be executed by the design testing tool 119) and outputting numerical metrics to determine how well the functionality of the integrated circuit device design 102 has been tested. The numerical metrics can include, for example, counts of how frequently assertions embedded in the integrated circuit device design 102 are triggered, where the assertions indicate that a certain function of the integrated circuit device design 102 was exercised or a certain combination of signals was triggered, among other examples. Functional testing may be deemed adequate when the numerical metric is greater than a threshold (e.g., 90%, 95%, or another percentage of a hypothetical possible maximum). Tests can be invoked on the integrated circuit device design 102, for example, by a software program that can configure and launch the design testing tool 119. The software program can be a standalone program, or can be a component of a larger program that includes other components of the system 100.

In various examples, the configuration 118 can describe signals that the design testing tool 119 should monitor. For example, the configuration 118 can include a list of triggering signals, as determined by the data model. Monitoring the signals can include, for example, counting the number of times the signals toggle and/or outputting (e.g., to a file) each change in a signal and when the change happened during the time span of a test.

In various examples, the configuration 118 can also include the power estimations determined by the data model training engine 112. For example, the configuration 118 can include a table of the power estimations, which can be indexed by a signal that triggers a functions associated with each power estimation. In this and other examples, the power estimations and the output of the configuration 118 can be used to determine what is referred to herein as directed power projection results 120. "Directed," in this context, is being used to refer to the fact that the directed power projection results 120 include analysis only of the signals indicated by the data model as significant contributors to the power consumption of the integrated circuit device design 102. In contrast, "full" power projection results would include substantially all signals in the integrated circuit device design 102. The directed power projection results 120 can be determined, for example, by multiplying the number of times a monitored signal toggled by the power estimation for the function triggered by the signal. In this and other examples, the computation can be performed, for example, by a software program that can process the output of the design testing tool 119. The software program can be a standalone program, or can be a component of a larger program that includes other components of the system 100.

The system 100 may include a simulator or an emulator as the design testing tool 119 because a simulator or emulator may be able to execute the functional tests 117 faster than the power projection tool 104 can execute the power tests 103. For example, the simulator or emulator would not also be performing power analysis, and thus may need less processing power, memory, and time to complete the functional tests 117.

In some examples, however, the power projection tool 104 can be used as the design testing tool 119. This may occur, for example, because power analysis needs to be performed on other parts of the integrated circuit device design 102 (e.g., parts that may not have easily definable functions or that fall outside of or between functions). Alternatively, resources for executing the power projection tool 104 (such as software licenses) may be more readily available for the power projection tool 104 than for a simulator or emulator.

In these and other examples, the configuration 118 can be organized to configure the power projection tool 104. For example, the workloads 110 can include list signals, logic blocks, and/or logic cells for which the power projection tool 104 should perform power analysis. To determine the configuration 118, the configuration generator 116 can, for example, identify the signals within a group of cells, and can add these signals to a list of signals that do not need to be monitored by the power projection tool 104. As a further example, the configuration generator 116 can include in the configuration 118 signals indicated by the data model training engine 112 as activating the functions. When the data model is not able to associate a signal with a function, in some examples, the configuration generator 116 can include these signals in the configuration 118 to ensure that the power contribution of these signals is captured.

Because the configuration 118 can include fewer than all of the signals of the integrated circuit device design 102, the directed power projection results 120, as determined by the power projection tool 104, may be much smaller, in terms of data size, than full power projection results for the same suite of tests, run the same amount of time. The smaller amount of data can be faster to analyze, and thus can be more useful in process of designing the integrated circuit device design 102.

Figure 2:
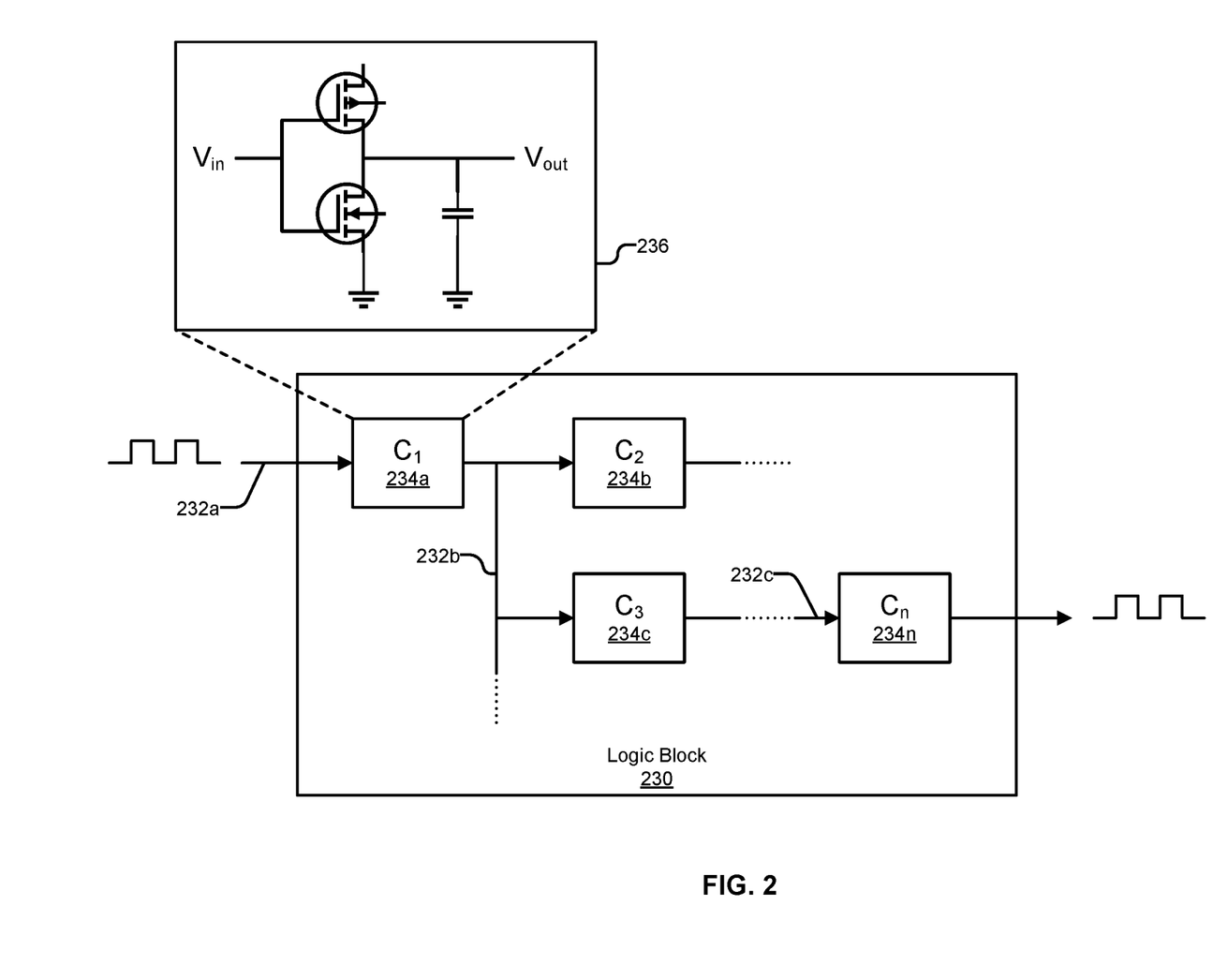
FIG. 2 is a block diagram of an example logic block that can be included in an integrated circuit device.

FIG. 2 is a block diagram of a logic block 230 that can be included in an integrated circuit device. The logic block 230 can implement, for example, a memory, an ALU, a control unit, or another function of the device. In various examples, the logic block 230 can include multiple cells 234a-234n, which can perform discrete logical operations, such as holding a value, inverting a value, passing along one value while not passing along a second, value, and so on. The cells 234a-234n can, together, perform more complex operations, such as arithmetic or logical operations. As illustrated by an inset diagram 236, a cell can include various circuit elements, such as transistors or capacitors. At a more abstract level, the cells 234a-234n may be referred to as gates, or logic gates.

The cells 234a-234n of the logic block 230 can be connected by signals 232a-232c, which may also be referred to as wires. Some of the signals 232a-232c can be signals input into the logic block 230 or signals that are output by the logic block 230. When a signal that is an input to a cell toggles (e.g., transitions from a high value to a low value and/or from a low value to a high value), the cell may charge (e.g., load power) and/or discharge (e.g., release power). The amount of power charged or discharged be the cell can be determined from the physical properties of the cell (which can be derived from the circuit that implements the cell), and/or from empirical analysis. The amount of times a particular signal toggles can thus be indicative of the amount of power consumed by the cell.

Accordingly, dynamic power can thus be computed using the following equation:

$$P_{dyn} = \sum_{i=1}^{n} (\text{Toggle Rate } (C_i) \times \text{Toggle Energy } (C_i))$$

This equation, however, does not take into consideration the operations performed by the logic block 230, and treats all signals and cells equally. When performing power analysis on just the logic block 230, where n may be on the order of hundreds of thousands, the amount of data produced, the time required to produce the data, and the time required to analyze the data may be tolerable. But for an entire chip, where n may be in the hundreds of millions, conducting power analysis may be very time consuming.

Figure 3:
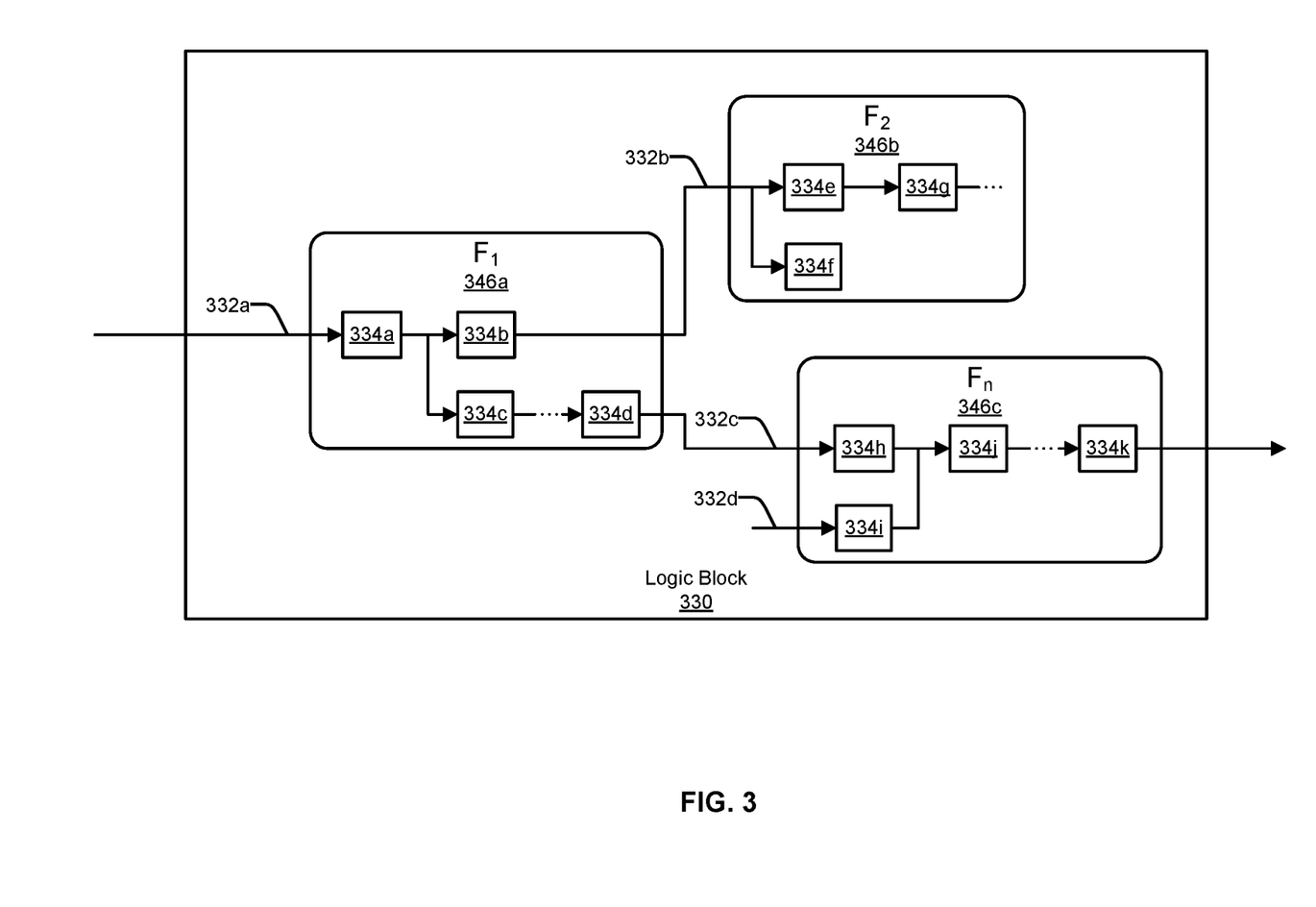
FIG. 3 includes a block diagram of an example logic block that can be included in an integrated circuit device.

FIG. 3 includes a block diagram of a logic block 330 that can be included in an integrated circuit device. FIG. 3 further illustrates an alternative way to view the logic block 330 for purposes of power analysis. As in the example of FIG. 2, the logic block 330 of FIG. 3 includes a number of cells 334a-334k, which can each perform discrete operations and, together, can perform complex operations. For example, the cells 334a-334k can implement a pipeline, with groups of the cells 334a-334k forming stages of the pipeline. As another example, one group of cells can implement an ALU, another can implement a first-in, first-out (FIFO) type of memory, and another can implement control logic for the ALU and the FIFO.

In these and other examples, when a set of input values are driven into a group of cells, the cells may charge or discharge the same way each time the same input values are driven into the group. Additionally, the signals between the cells may toggle the same way. For example, when the group of cells implement an ALU, for a given set of input operands, most of the cells in the ALU are likely to be activated. Though the group of cells and the signals between the cells can behave differently when different inputs values are driven into the cells, when averaged over a large and varied number of inputs, the power consumption of the cells, as a group, may be predictable.

Thus, in various examples, the logic block 330 can be viewed not as a homogenous collection of cells and signals, but rather as groups of related cells, which are referred to herein as functions 346a-346c. Functions may also be referred to as events or power events. Functions 346a-346c, in this context, include cells that, together, perform a particular function or operation for the logic block 330, such an ALU or a FIFO. The functions 346a-346c can each be associated with one or more signals 332a-332d, which trigger the functions 346a-346c, which may be referred to herein as triggering signals. In some examples, the same group of cells can perform different functions, which can result in different power consumption by the group of cells. For example, performing addition with an ALU may result in different power consumption than when performing multiplication. In this and other examples, different functions can be defined that group the same cells, with the functions being distinguished by the values on the triggering signals that activate the respective functions.

An estimated power consumption can be determined for each group of cells. For example, the amount of power that each cell in the group can charge and/or discharge may be known, and an approximate power consumption of the whole group can be determined by summing the amount of power consumed by each cell. In this and other examples, determining the power consumption of the logic block 330 can be reduced to determining the number of times the triggering signals 332a-332d toggle, and multiplying the number of toggles by the power consumption of each function 346a-346c, as provided by the following equation:

$$P_{dyn} = \sum_{i=1}^{n} (\text{Toggle Rate } (F_i) \times \text{Energy Cost } (F_i))$$

For an integrated circuit device of any size, n in the above equation can be on the order of tens of thousands. Power projection that uses the approach illustrated in FIG. 3 can thus result in a much smaller amount of data that needs to be analyzed. As discussed above, application of machine learning to identify the functions 346a-346c can provide technique for determining the functions 346a-346c that removes the human element needed to identify the functions 346a-346c, which can be better spent elsewhere. Additionally, machine learning can be included in an automated process, such that updating the functions 346a-346c as the design of the logic block changes can be performed frequently and quickly.

Figure 4:
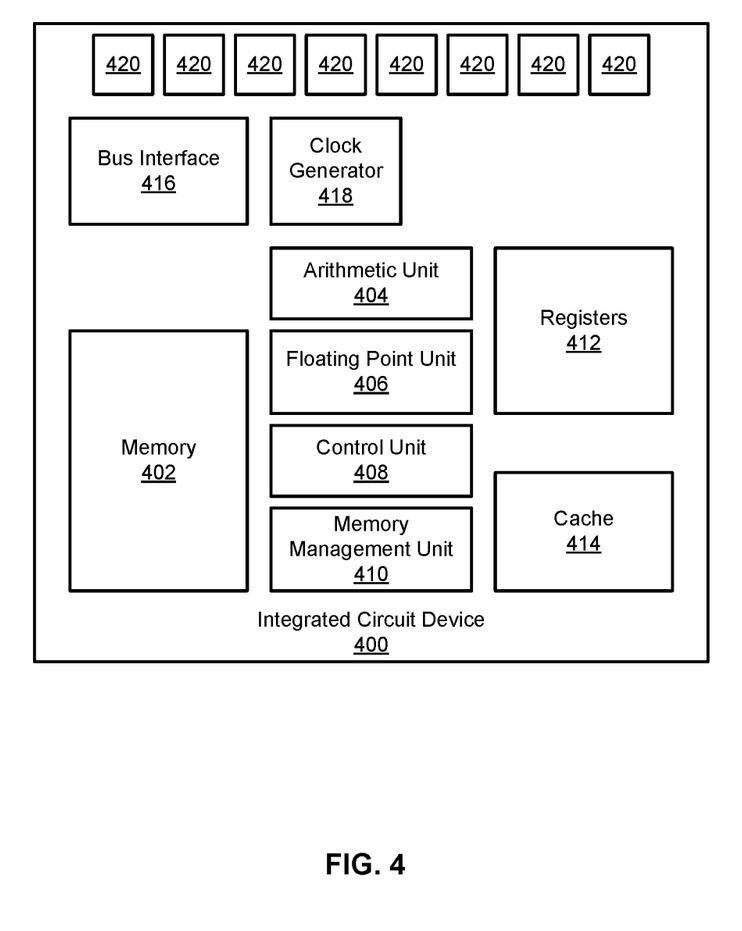
FIG. 4 includes a block diagram of an example integrated circuit device.

FIG. 4 includes a block diagram of an example integrated circuit device 400, as an example of a device on which the power projection techniques discussed above can be applied. In various examples, the integrated circuit device 400 semi-conductor-based device that includes multiple layers of substrates forming transistors, capacitors, vias, and other circuit elements. In the example of FIG. 4, the integrated circuit device 400 is implemented on a single die. In other examples, the integrated circuit device 400 can be implemented using multiple dies.

The example integrated circuit device 400 includes a memory 402, an arithmetic unit 404, a floating point unit 406, a control unit 408, a memory management unit 410, registers 412, a cache 414, a bus interface 416, a clock generator 418, and multiple I/O pads 420.

The memory 402 can include circuits that are able to store values. For example, the memory 402 can store instructions that are to be executed by the integrated circuit device 400. The memory 402 can be implemented using, for example, a variety of Static Random Access Memory (SRAM). In some examples, the memory 402 may be small, in view of the limited amount of space in the integrated circuit device 400.

The arithmetic unit 404 may be configurable to perform arithmetic or logical operations. The arithmetic unit 404 can be configured, for example, to read operands from one or more of the registers 412, and to place results in a register.

The floating point unit 406 can perform floating point arithmetic. The floating point unit 406 can also be configured to read operations from the registers 412 and to write results to the registers 412.

The control unit 408 can include circuitry for executing instructions and/or for coordinating the activities of the other blocks in the integrated circuit device 400. For example, the control unit 408 can configure the registers from which arithmetic unit 404 is to read operands, as well as the operation the arithmetic unit 404 is to perform on the operands. The control unit 408 can further instruct the arithmetic unit 404 where to place a result of the operation. As a further example, the control unit 408 can write data into the registers 412, and read data from the registers 412, possibly to move the data to the memory 402 and/or elsewhere.

The memory management unit 410 can managed the memory 402, the cache 414, and possibly also the registers 412. The memory management unit 410 can, for example, cause data to be moved from the memory 402 to the cache 414, or vice versa. As a further example, the memory management unit 410 can cause data to be moved from the cache 414 to an external memory, or vice versa. In various examples, the operations the memory management unit 410 perform are controlled by the control unit 408. For example, when the control unit 408 determines that the integrated circuit device 400 is ready for new instructions to be loaded into the memory 402, the control unit 408 can instruct the memory management unit 410 to obtain the instructions from an external memory.

The registers 412 can provide temporary storage for values being operated on by the integrated circuit device 400. Compared to the memory 402, each register is quite small, storing, for example, one data word each (where a data word can be 16, 32, 64, or another number of bits long). Each register is also directly accessible, such that the number of registers may be limited by the wiring required for each to be independently readable and writeable. Because the registers 412 are directly accessible and can be read or written faster than the memory 402, it may be preferable for values being operated on by, for example, the arithmetic unit 404 or the point unit 406 to be in the registers 412, rather than in the memory 402.

The cache 414 is a memory where data that was recently used by the integrated circuit device 400, and/or that may soon need to be used, can be stored. The data can, for example, have been in the memory 402, was operated on by the control unit 408, and then was moved to the cache 414 to make space in the memory 402 for new data. As another example, the integrated circuit device 400 may have needed a particular data word, which the memory management unit 410 may have loaded into the cache 414 along with a set of data words (e.g., a cache line), under the assumption that the integrated circuit device 400 may need a data word that was stored in external memory next to the particular data word. The cache 414 can thus save time by reducing how frequently the integrated circuit device 400 needs to access external memory. Determining when data needs to be loaded into the cache from an external memory, and/or when data needs to be moved out of the cache, can be handled by the memory management unit 410.

The bus interface 416 can include circuitry that enables the integrated circuit device 400 to communicate with other devices, such as external memories. The bus interface 416 can implement various protocols, such as Advanced eXtensible Interface (AXI), Advanced High-performance Bus (AHB), Peripheral Component Interconnect (PCI), or another bus protocol. The bus interface 416 can be connected to the I/O pads 420 to enable the bus interface 416 to communicate with external devices. In various examples, the integrated circuit device 400 can include multiple bus interfaces, which may implement different protocols.

The clock generator 418 can generate one or more clock signals for the integrated circuit device 400, which may have different frequencies. In some examples, the clock generator 418 operates off of a clock input to the integrated circuit device 400 (received at one of the I/O pads 420), which the clock generator 418 can use to generate clock signals of different frequencies.

The I/O pads 420 can include circuitry for connecting the integrated circuit device 400 to the physical pins or balls of the package that encloses the integrated circuit device 400. The pins or balls (e.g., drops of conductive material) can connect the integrated circuit device 400 to a printed circuit board. Some of the I/O pads 420 can be for inputting signals into the integrated circuit device 400, others can be for outputting signals from the integrated circuit device 400, and/or others can be bi-directional. In most cases, the I/O pads 420 are present along most of the edges of the integrated circuit device 400, but only a few are illustrated here, for the sake of clarity.

These blocks illustrated in FIG. 4 provide examples of blocks that a can be found in an integrated circuit device, and are intended only to be illustrative. In other examples, an integrated circuit device can include components that are not illustrated here, can include multiple instances of a component, and/or can lack some of the components that are included in this illustration. The arrangement and spacing of the blocks is also not intended to be representative of the arrangement and spacing that may be found in an actual device. The arrangement and spacing have been selected only for the convenience of the illustration.

Figure 5:
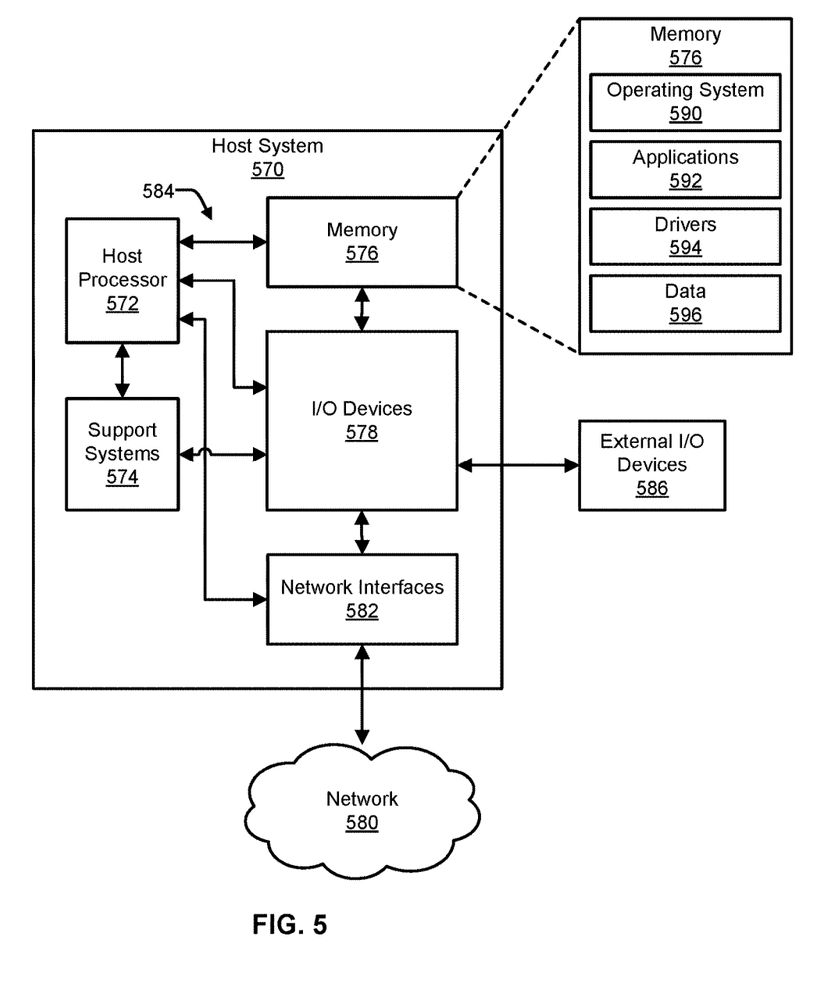
FIG. 5 includes a block diagram that illustrates an example of a host system 570 in which the integrated circuit device of FIG. 4 can be used.

FIG. 5 includes a block diagram that illustrates an example of a host system 570 in which the integrated circuit device of FIG. 4 can be used. In some examples, the host system 570 of FIG. 5 can be used to implement a general purpose computer, such as a desktop computer, a laptop computer, a server computer, a thin client, and so on. In some examples, the host system 570 can be used to implement mobile computing devices, such as a mobile phone, a smart phone, a personal digital assistant (PDA), or a tablet computer, among other examples. In some examples, the host system 570 can be used to implement somewhat more special purpose devices, such as home assistants, gaming consoles, electronic books (e-books), media centers, and so on. In some examples, the host system 570 can be used to implement computing devices incorporated into appliances, automobiles and other vehicles, robots, and other electronic devices.

The example host system 570 of FIG. 5 includes a host processor 572, processor memory 576, Input/Output (I/O) devices 578, network interfaces 582, and various support systems 574. In various implementations, the host system 570 can include other hardware that is not illustrated here.

The host processor 572 is a general purpose integrated circuit that is capable of executing program instructions. In some examples, the host processor 572 can include multiple processing cores. In a multi-core processor, each core may be able to independently execute program code. In some examples, the cores may share resources, such as buses and caches. In some examples, the host processor 572, whether single core or multi-core, may be a multi-threaded processor, in which case the host processor 572 can execute multiple threads of execution (e.g., independent sets of program code) at the same time. In some examples, the host system 570 can include more than one host processor 572.

The memory 576 can include memory that is used by the host processor 572 for storage of program code that the host processor 572 is in the process of executing, as well as for storage of values that are being operated on by the host processor 572. For example, the memory 576 can be storing an operating system 590, one or more applications 592, one or more device drivers 594, and data 596 associated with the operating system 590, the applications 592, and/or the drivers 594. In various examples, memory 576 can be implemented using volatile memory types (such as Random Access Memory (RAM) type memories) and/or non-volatile memory types (such as Read-Only Memory (ROM), flash memory, etc.). In some examples, some or all of the memory 576 may be accessible to the I/O devices 578. The processor memory 576 is often referred to as DRAM, though the actual implementation of the memory may not make use of Dynamic Random Access Memory.

The operating system 590 can coordinate the activities of the hardware of the host system 570, as well as the activities of the applications 592 and drivers 594. For example, the operating system 590 can perform operations such as scheduling tasks, executing applications, or controlling peripheral devices. In some examples, the operation system 590 can include a hypervisor which can support the operation of virtual machines on the host system 570. In some examples, the hypervisor runs as kernel space application. In these and other examples, each virtual machine can execute an independent operating system, and may have different virtual hardware configurations. Examples of operating systems include Unix, Linux, Windows, Mac OS, iOS, Android, and the like. The operating system 590 may also be a proprietary operating system.

The applications 592 can enable a user to interact with the host system 570 and/or with systems on the network 580. The applications 592 can include user space applications, such as web browsers, text editors, video or audio players, and so on. Each of the applications 592 can be embodied as program code, or instructions that, when executed, cause the host processor 572 to perform operations that implement the applications 592. In various examples, the code for the applications 592 can be stored on a non-volatile storage medium, such as a disk drive, and can be copied into the memory 576 when being executed.

The drivers 594 can include programs that manage communications between the operating system 590 and/or applications 592 and hardware components of the host system 570, such as the I/O devices 578 and network interfaces 582. For example a driver can provide an Application Programming Interface (API) that provides abstract commands for using the functions of an I/O device. In this example, the API may be standardized, and the driver may be able to translate the abstract commands to specific commands for a particular I/O device. Drivers are often kernel space applications, so that user-space code may be prevented from accidentally or intentionally misusing the hardware of the host system 570.

The data 596 can include data used and/or operated on by the operating system 590, applications 592, and/or drivers 594. Examples of such data include web pages, video data, audio data, images, user data, and so on. Alternatively or additionally, the data 596 can include software libraries that maybe used by the operating system 590, applications 592, and/or drivers 594. In some examples, the data 596 may be accessible to systems on the network 580.

The I/O devices 578 can include hardware that adds functionality to the example host system 570. For example, the I/O devices 578 can include non-volatile storage devices, such as solid state drives, magnetic drives, optical drives, and/or tape drives, among other examples. The I/O devices 578 can further include accelerators such as graphics accelerators, and other, more special purpose, devices. As another example, the I/O devices 578 can include hardware for connecting to external I/O devices 586, such as keyboards, monitors, printers, and external storage drives among other devices. The network interfaces 582 are also I/O devices, though are illustrated separately here for the sake of clarity. Herein, some I/O devices may also be referred to as peripheral devices. In various examples, an I/O device can include a processor and memory that are additional to the host processor 572 and memory 576 of the host system 570. The processor of the I/O device may operate independently of the host processor 572, or maybe used by the host processor 572 for various purposes. For example, the I/O device can include a Graphics Processing Unit (GPU), which the host processor 572 can use for large computations. In some examples, the host system 570 can also be connected to external I/O devices 586, such as external hard drives.

In some examples, one or more of the I/O devices 578 can be based on one of the Peripheral Component Interconnect (PCI) standards. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices in a host system. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the host system 570 can include a storage device that implements NVMe as the primary communication interface.

A PCI-based device can include one or more functions. A "function" describes operations that may be provided by the device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, a PCI-based device can include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to the operating system 590 and/or applications 592 to be multiple devices providing the same functionality. The functions of an SR-IOV-capable device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host system 570.

The network interfaces 582 can enable the host system 570 to communicate with a network 580 or with multiple networks. The network interfaces 582 can include, for example, one or more network interface cards (NICs). The network interfaces 582 can include, for example, physical ports for connecting to a wired network. Alternatively or additionally, the network interfaces 582 can include antennas for connecting to a wireless network. In some examples, the network interfaces 582 can include more than one physical port, and/or more than one antenna, so that the host system 570 can communicate with multiple networks at the same time.

The support systems 574 can include various hardware that supports the operations of the host processor 572 and/or the I/O devices 578. For example, the support systems 574 can include a boot ROM that stores the code for the Basic Input/Output System (BIOS) of the host system 570, and that enables the host system 570 to boot from being powered on. As another example, the various support systems 574 can include a power supply and power subsystem. Other devices that may be found in the support systems 574 can include a Board Management Controller (BMC) and/or various other volatile or non-volatile memories.

The host system 570 can further include one or more busses 584, which may also referred to as interconnects. The busses 584 can enable the various components of the example host system 570 to communicate with one another. For example, the busses 584 can include a bus that is dedicated to communications between the host processor 572 and the processor memory 576. As another example, the busses 584 can include an I/O bus, which enables the host processor 572 to communicate with the I/O devices 578, and which may enable the I/O devices 578 to communicate among each other. In some examples, the I/O bus is a PCI-based bus or bus network. The busses 584 can include other busses, such as a power management bus, sideband busses, control busses, and/or dedicated busses between certain components (e.g., a BMC and the host processor 572).

The memory 576, storage devices, and other memories discussed above are each examples of computer-readable medium. Other examples of computer-readable medium include removable storage devices, such as magnetic tapes, floppy disks, Compact Discs (CDs), Digital Versatile Discs (DVDs), Blue-Ray disks, and flash memory drives, among other examples. In each of these examples the compute-readable medium is capable of storing program code that can be executed by the host processor 572. In some cases, the computer-readable medium may be non-transitory, meaning that the data stored on the computer-readable medium remains stored on the medium when power is not applied to the computer readable medium. In contrast, when power is removed from transitory computer-readable medium, such as RAM, the data is deleted from the medium. Examples of non-transitory computer-readable medium include ROM-based memory, hard disks, removable disks such as those listed above, and flash-based memory, among other examples.

FIG. 6 includes a flowchart illustrating an example of a process 600 for power analysis of an integrated circuit device design. The integrated circuit device design can be provided in the form of code that describes the components and operations of the integrated circuit device design, such as in architectural code, RTL code, netlist code, or another format. In various examples, the process 600 can be implemented by a computing device that has a processor and a non-transitory computer-readable medium that can be read by the processor. The non-transitory computer-readable medium can be storing instructions that, when executed by the processor, cause the processor to perform operations include the steps of the example process 600.

At step 602, the process 600 includes generating a set of workloads from a set of power analysis tests, the set of workloads including a subset of data of the set of power analysis tests, the subset of data being less than all data of the set of power analysis tests. The set of power analysis tests can exercise operations of the integrated circuit device design. A power analysis test can, for example, include data to input into the integrated circuit device design over a span of time. In this example, generating the set of workloads includes dividing the data into segments each including a portion of the span of time and including the segments in workloads of the set of workloads. As another example, generating the set of workloads can include identifying particular functions of the integrated circuit device design exercised by the set of power analysis tests, and selecting one or more particular power analysis tests that together exercise substantially all functions of the integrated circuit device design at least once.

At step 604, the process 600 includes causing execution of a power projection tool on the integrated circuit device design, wherein the power projection tool takes as input the set of workloads and drives the subset of data into the integrated circuit device design. Causing execution of the power projection tool can include, for example, invoking the power projection tool on a command line, through a function call or a system call, and/or by forking a process that launches the power projection tool. When executing, the power projection tool exercises functions of the integrated circuit device design, each function including toggling of signals of the integrated circuit device design.

At step 606, the process 600 includes obtaining results from the execution of the power projection tool, the results including a listing of signals of the integrated circuit device design and estimated power consumption associated with signals in the listing of signals. The listing of signals can include substantially all signals in the integrated circuit device design. The estimated power consumption output power projection tool can be based on a toggle rate of the signals in the circuit device design, and a charge or discharge of a load on cell affected by the signals. In some examples, the process 600 includes executing a power projection test for a pre-determined amount of time, the pre-determined amount of time being less than an amount of time required for a full power projection analysis.

At step 608, the process 600 includes inputting the results from the power projection tool into a data model, wherein the data model learns from the results the listing of signals and the estimated power consumption, and wherein the data model outputs a set of functions performed by the integrated circuit device design, a set of signals that trigger the set of functions, and particular estimated power consumption associated with each of the set of functions. The data model can output a set of functions performed by the integrated circuit device design, a set of signals that trigger the set of functions, and particular estimated power consumption associated with each of the set of functions. A function can be associated with an abstract operation performed by the integrated circuit device design, such as a memory read, a memory write, an instruction fetch, or an arithmetic computation, among other examples. A function can be described by the logic cells in the integrated circuit device design that perform a particular operation.

To learn the functions of the circuit device design, in various examples, the data model can associate signals in the listing of signals with cells of the circuit device design that are driven by the signals. For example, the data model can group cells that are consistently activated by a same signal. The data model can output such groups of cells as identified functions. The data model can also determine an estimated power consumption for each function. The power consumption of a group of cells that perform a function can be assumed to be approximately the same, on average and over a large and varied number of inputs, each time the cells are activated to perform the function. Thus, for example, the data model can determine the estimated power consumption for a function by summing an estimated power consumption of cells in a group of cells that perform the function, where the estimated power consumption of the cells comes from the results produced by the power projection tool.

At step 610, the process 600 includes generating, using the output of the data model, a configuration for a design testing tool, wherein the configuration includes the set of signals that trigger the set of functions, the set of signals being less than all signals in the listing of signals, and wherein the configuration instructs the design testing tool to monitor toggling of the set of signals. In some examples, the configuration can also include the particular estimated power consumption determined by the data model, for example in a table index by the set of signals.

At step 612, the process 600 includes causing execution of a design testing tool, wherein the design testing tool takes as input the configuration, and wherein the design testing tool performs tests on the integrated circuit device design and outputs results, the results including a record of activity of the set of signals during performance of the tests. Causing the design testing tool to be executed can include invoking the tool on a command line, through a function call or a system call, and/or by forking a thread that launches the tool. In some examples, the design testing tool is a simulator or an emulator. In some examples, the power projection tool can be used as the design testing tool.

In some examples, the process 600 can further include computing an estimated power consumption of the integrated circuit device design using the record of activity and the particular estimated power consumption output by the data model. For example, the number of times a signal in the set of signals toggled can be multiplied by an estimated power consumption for a function triggered by the signal. In various examples, estimated power consumption can be computed at a block level, model level, sub-system level, and/or at the chip level. Power consumption estimates at these and other levels of the design can be used to portions of the integrated circuit device design that have high power consumption that may need to be redesigned.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples are described herein, including the best mode known to the inventors for carrying out the examples. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for power analysis of an integrated circuit device design using machine learning, the method implemented by a computing device and comprising:
   generating, by the computing device, a set of workloads for a power projection tool, wherein the set of workloads are generated from power analysis tests, wherein a power analysis test includes stimulus to input into the integrated circuit device design over a span of time, wherein the set of workloads includes less than all stimulus included in the power analysis tests;
   executing, by the computing device, the power projection tool on the integrated circuit device design, wherein the power projection tool exercises functions of the integrated circuit device design by executing the set of workloads, each function including toggling of signals of the integrated circuit device design, and wherein the power projection tool outputs results, the results including estimated power consumption associated with the toggling of the signals, wherein the functions are implemented by logic cells;

obtaining, by the computing device, a machine learning data model trained to output the functions, a set of signals that trigger the functions, and a particular estimated power consumption associated with each of the functions by inputting the toggling of the signals and the estimated power consumption associated with the toggling of the signals into the machine learning data model;

inputting, by the computing device, the results into the machine learning data model so as to cause the machine learning data model to generate an output comprising the functions, the set of signals that trigger the functions, and the particular estimated power consumption associated with each of the functions;

generating, by the computing device, using the output of the machine learning data model, a configuration for a design testing tool, wherein the configuration includes the set of signals that trigger the functions, the set of signals being less than all signals in the integrated circuit device design;

executing, by the computing device, the design testing tool on the integrated circuit device design, wherein the design testing tool uses the configuration to monitor toggling of the set of signals; and computing, by the computing device, an estimated overall power consumption of the integrated circuit device design using an output of the design testing tool and the particular estimated power consumption associated with each of the functions.

2. The method of claim 1, wherein the machine learning data model learns the functions by identifying cells of the integrated circuit device design that are affected by the toggling of the signals and grouping affected cells.

3. The method of claim 1, wherein the machine learning data model determines the particular estimated power consumption associated with each of the functions from a rate of the toggling of the signals and a charge or discharge of cells affected by the toggling of the signals.

4. The method of claim 1, wherein, when executed, the power projection tool is configured to perform power analysis on substantially all signals of the integrated circuit device design.

5. The method of claim 1, wherein the design testing tool is a simulator or an emulator.

6. The method of claim 1, further comprising:
using the power projection tool as the design testing tool.

7. A computer-implemented method for power analysis of an integrated circuit device design, the method comprising:

generating, by a computing device, a set of workloads from a set of power analysis tests, the set of workloads including a subset of data of the set of power analysis tests, the subset of data being less than all data of the set of power analysis tests;

causing, by the computing device, execution of a power projection tool on the integrated circuit device design, wherein the power projection tool takes as input the set of workloads and drives the subset of data into the integrated circuit device design;

obtaining, by the computing device, results from the execution of the power projection tool, the results including a listing of signals of the integrated circuit device design and estimated power consumption associated with signals in the listing of signals;

obtaining, by the computing device, a data model trained to output a set of functions of the integrated circuit device design, a set of signals that trigger the set of functions, and a particular estimated power consumption associated with each of the set of functions by inputting toggling of signals of the integrated circuit device design and the estimated power consumption associated with the toggling of the signals into the data model, wherein the set of functions are implemented by logic cells;

inputting, by the computing device, the results into the data model so as to cause the data model to generate an output comprising the set of functions, the set of signals that trigger the set of functions, and the particular estimated power consumption associated with each of the set of functions;

generating, by the computing device, using the output of the data model, a configuration for a design testing tool, wherein the configuration includes the set of signals that trigger the set of functions, the set of signals being less than all signals in the listing of signals, and wherein the configuration instructs the design testing tool to monitor toggling of the set of signals; and causing by the computing device, execution of a design testing tool, wherein the design testing tool takes as input the configuration, and wherein the design testing tool performs tests on the integrated circuit device design and outputs results, the results including a record of activity of the set of signals during performance of the tests.

8. The computer-implemented method of claim 7, wherein the listing of signals includes substantially all signals in the integrated circuit device design.

9. The computer-implemented method of claim 7, wherein a power analysis test from the set of power analysis tests includes data to input into the integrated circuit device design over a span of time, wherein generating the set of workloads includes dividing the data into segments each including a portion of the span of time and including the segments in workloads of the set of workloads.

10. The computer-implemented method of claim 7, wherein generating the set of workloads includes identifying particular functions of the integrated circuit device design exercised by the set of power analysis tests, and selecting one or more particular power analysis tests that together exercise substantially all functions of the integrated circuit device design at least once.

11. The computer-implemented method of claim 7, wherein the estimated power consumption associated with the signals is based on a toggle rate of the signals and a charge or discharge of a load on cells affected by the signals.

12. The computer-implemented method of claim 7, wherein the data model associates the signals in the listing of signals with cells of the integrated circuit device design that are activated by the signals, and wherein the data model uses the associations to determine groups of cells that perform functions in the set of functions.

13. The computer-implemented method of claim 12, wherein the data model determines the particular estimated power consumption associated with each of the set of functions by summing an estimated power consumption of cells in each group of cells, wherein the data model determines the estimated power consumption of the cells using the estimated power consumption input into the data model.

14. The computer-implemented method of claim 7, wherein configuration excludes signals between cells that perform the set of functions.

15. The computer-implemented method of claim 7, further comprising:
computing an estimated power consumption of the integrated circuit device design using the record of activity and the particular estimated power consumption output by the data model.

16. The computer-implemented method of claim 7, wherein functionality exercised by the tests, as measured by a numerical metric, is greater than a threshold.

17. A non-transitory computer-readable medium having stored thereon instructions that, when executed by one or more processors, cause the one or more processors to perform operations including:
generating a set of workloads from a set of power analysis tests, the set of workloads including a subset of data of the set of power analysis tests, the subset of data being less than all data of the set of power analysis tests;
causing execution of a power projection tool on an integrated circuit device design, wherein the power projection tool takes as input the set of workloads and drives the subset of data into the integrated circuit device design;
obtaining results from the execution of the power projection tool, the results including a listing of signals of the integrated circuit device design and estimated power consumption associated with signals in the listing of signals;
obtaining a data model trained to output a set of functions of the integrated circuit device design, a set of signals that trigger the set of functions, and a particular estimated power consumption associated with each of the set of functions by inputting toggling of signals of the integrated circuit device design and the estimated power consumption associated with the toggling of the signals into the data model, wherein the set of functions are implemented by logic cells;
inputting the results into the data model so as to cause the data model to generate an output comprising the set of functions, the set of signals that trigger the set of functions, and the particular estimated power consumption associated with each of the set of functions;
generating, using the output of the data model, a configuration for a design testing tool, wherein the configuration includes the set of signals that trigger the set of functions, the set of signals being less than all signals in the listing of signals, and wherein the configuration instructs the design testing tool to monitor toggling of the set of signals; and
causing execution of a design testing tool, wherein the design testing tool takes as input the configuration, and wherein the design testing tool performs tests on the integrated circuit device design and outputs results, the results including a record of activity of the set of signals during performance of the tests.

18. The non-transitory computer-readable medium of claim 17, wherein the data model is configured to use unsupervised learning to identify cells of the integrated circuit device design that are activated by the set of signals.

19. The non-transitory computer-readable medium of claim 17, wherein the data model is configured to group cells of the integrated circuit device design that are consistently activated by a same signal from the set of signals.

20. The non-transitory computer-readable medium of claim 19, wherein the data model outputs a group of cells as a function from the set of functions.

21. The non-transitory computer-readable medium of claim 19, wherein the data model determines the particular estimated power consumption associated with a function from the set of functions by summing estimated power consumption associated with cells in a group of cells comprising the function.

* * * * *

UNITED STATES PATENT AND TRADEMARK OFFICE
CERTIFICATE OF CORRECTION

Page 1 of 1

PATENT NO. : 10,691,850 B1
APPLICATION NO. : 16/219205
DATED : June 23, 2020
INVENTOR(S) : Lev Makovsky, Adi Habusha and Ron Diamant It is certified that error appears in the above-identified patent and that said Letters Patent is hereby corrected as shown below:

On the Title Page

Item (72):
Inventor information. Please delete "Lev Makovsky, Seattle, WA" and add "Lev Makovsky, Nesher (IL)"

Signed and Sealed this
Fifteenth Day of September, 2020

Andrei Iancu
*Director of the United States Patent and Trademark Office*